United States Patent [19]
Gumtow

[11] 3,735,494
[45] May 29, 1973

[54] DIP STICK NORMALLY HOUSED IN CURVED FILLER TUBE

[75] Inventor: Herbert A. Gumtow, Brookfield, Wis.

[73] Assignee: Briggs & Stratton Corporation, Wauwatosa, Wis.

[22] Filed: June 4, 1971

[21] Appl. No.: 149,911

[52] U.S. Cl. ............................................. 33/126.7 R
[51] Int. Cl. .............................................. G01f 23/04
[58] Field of Search ............................... 33/126.7 R; 15/210 B

[56] References Cited

UNITED STATES PATENTS

| 1,588,889 | 6/1926 | Hills | 33/126.7 R |
| 3,591,886 | 7/1971 | Denver | 15/210 B |
| 2,705,372 | 4/1955 | Cornell | 33/126.7 R |
| 2,799,089 | 7/1957 | Banker | 33/126.7 R |
| 3,371,418 | 3/1968 | Moeller | 33/126.7 R |
| 3,488,855 | 1/1970 | Howe | 33/126.7 R |
| 1,421,672 | 7/1922 | Clarke | 33/126.7 R X |

FOREIGN PATENTS OR APPLICATIONS

| 695,444 | 9/1930 | France | 33/126.7 R |
| 1,458,582 | 10/1966 | France | 33/126.7 R |

Primary Examiner—Robert B. Hull
Attorney—Ira Milton Jones

[57] ABSTRACT

A flat, rod-like dip stick, normally housed in a curved filler tube, and bowingly flexible to accommodate tube curvature, has a longitudinal slot therethrough above its indicating portion. A disc is anchored in the slot by abutments engaging the flat faces of the dip stick. Projecting equally beyond said faces and normally seated near the bottom of the tube, the disc prevents the tube from wiping the dip stick during withdrawal.

2 Claims, 5 Drawing Figures

PATENTED MAY 29 1973

INVENTOR
*Herbert A. Gumtow*
BY
ATTORNEY

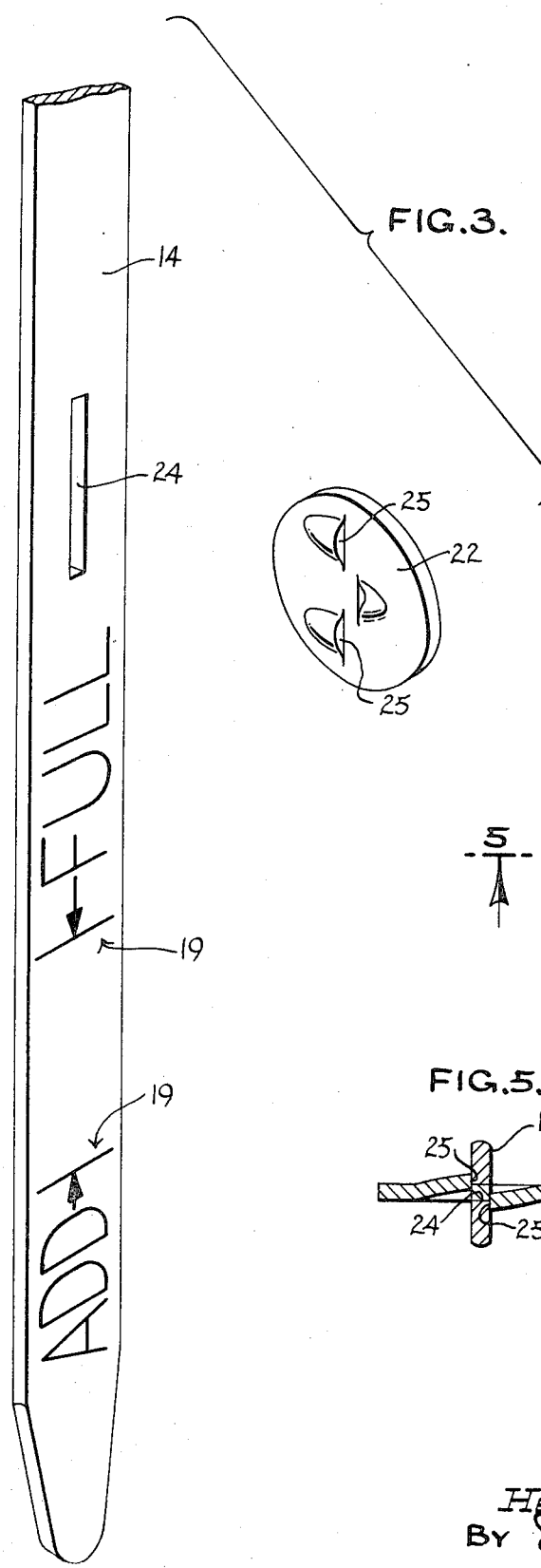

DIP STICK NORMALLY HOUSED IN CURVED FILLER TUBE

This invention relates to dip sticks such as are used for checking the level of oil in an engine crankcase, and it is more particularly concerned with a dip stick that is normally received in a relatively long and rather sharply curved filler tube.

Dip sticks are commonly provided for enabling a visual check to be made on the level of oil in gasoline engine oil reservoirs. In most cases the dip stick is a flat, slender rod that extends down through a tube into the crankcase or other oil reservoir, and the dip stick has a plug or cap secured to its upper portion by which this tube is closed and which supports the dip stick in a normal position projecting a predetermined distance down into the oil supply. In some engine installations the dip stick extends down into the crankcase through a tube of a diameter just large enough to receive it, and oil is filled into the crankcase through another tube of substantially larger diameter. On many engines, and especially on single-cylinder engines, the dip stick extends down into the crankcase through the oil filler tube, and is secured to the cap that closes the upper end of that tube.

It often happens that the tube through which the dip stick extends must curve along its length, in order for the top of that tube to be disposed at a readily accessible location and for its bottom end portion to open into the crankcase at a suitable downward angle. In such cases the dip stick is often accommodated to the curvature of the tube by reason of the fact that the dip stick is bowingly flexible.

Where the tube that receives the dip stick serves also as a filler, that tube must have a diameter substantially larger than the width of the dip stick, in order to permit oil to be filled into the crankcase at a reasonably fast rate. If the filler tube in such an installation has a substantial curvature along its length, then it must engage the dip stick at two points, to bow the dip stick to a conforming curvature. Consequently, as the dip stick is withdrawn from the filler tube, it is wiped by the inner radius of the curved wall of the tube, and by the lower end of the tube. If the dip stick happens to be so oriented rotationally that its faces make flatwise engagement with these portions of the filler tube, most of the oil on those surfaces of the dip stick is removed by such engagement. A person checking engine oil with such an installation, and who then failed to observe the dip stick closely and note the oil on its narrow edges, would be led to believe that the oil level in the crankcase was dangerously low, even though it was full to capacity.

This problem does not arise with a dip stick that is housed in a dip stick tube separate from the filler tube because in such cases the diameter of the dip stick tube is made just slightly greater than the width of the dip stick, and consequently the tube keeps the dip stick centered all along its length to prevent the wiping action described above.

The problem of oil wiping on dip sticks housed in curved filler tubes has existed for some time with small single-cylinder engines such as are used on lawn mowers, garden tractors and the like. Space limitations on such engines and the machines on which they are installed make a curved filler tube imperative, and the curvature of the filler tube must be such as to impart some bowing flexure to the dip stick as it is moved lengthwise along the tube. The arrangement that poses the above described wiping problem seems to be unavoidable on such engines. Heretofore the wiping of the flat surfaces of the dip stick as it was withdrawn has been accepted as inevitable, and it has simply been presumed and hoped that the operator of the engine would not get the dip stick into its rotational position in which it would be wiped clean, or, that if he did so, he would carefully inspect the edges of the dip stick, or would dip it again, before concluding that oil should be added to the crankcase.

In part, the present invention resides in the recognition, at long last, that the above described wiping situation constitutes a nuisance — and in fact more than a nuisance because it can result in inadvertent damage to a good engine — and that something can and should be done to eliminate it.

It is thus a general object of this invention to provide a very simple and inexpensive means for preventing a dip stick that is normally housed in a curved filler tube from being wiped during its withdrawal from the tube as a result of its engagement against the filler tube at the lower end thereof and at the inside radius of the curve therein.

Another object of this invention is to provide a dip stick that is normally housed in a filler tube having substantial curvature along its length, which dip stick provides an accurate and readily visible indication of the level of the liquid that it gages regardless of the position or orientation that it may have when it is being withdrawn.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 3 is a disassembled perspective view of the dip stick of this invention;

FIG. 4 is a fragmentary edge-on view of the assembled dip stick; and

FIG. 5 is a cross-sectional view taken on the plane of the line 5—5 in FIG. 4.

Figure 1:
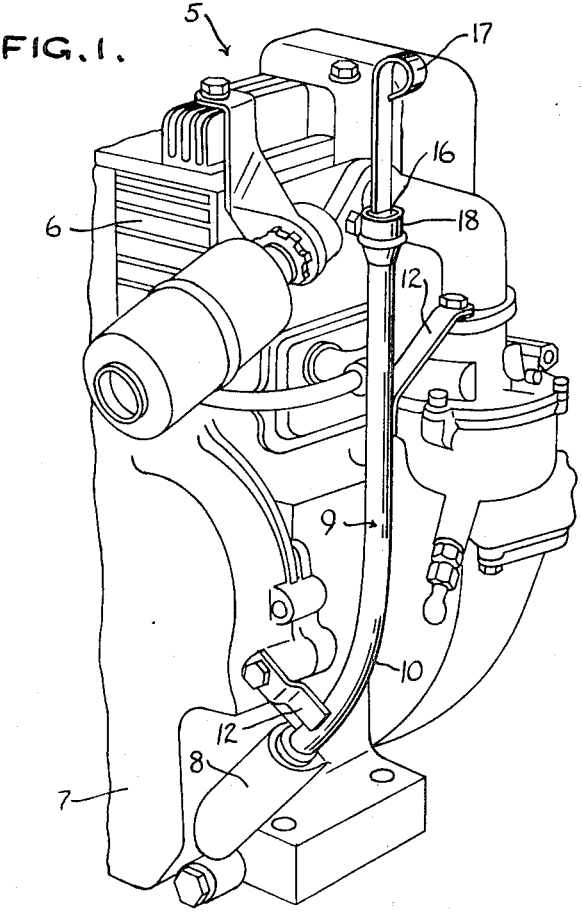
FIG. 1 is a fragmentary perspective view of a single-cylinder engine with a curved crankcase oil filler tube having a dip stick in its normal position therein.

Referring now more particularly to the accompanying drawings, the numeral 5 designates generally a gasoline engine having a single upright cylinder 6 and a crankcase 7 beneath the cylinder that serves as an oil reservoir. The cylinder and other parts of the engine are so located that oil must be filled into the crankcase through a bored boss 8 at one side thereof, defining a filler passage opening obliquely downwardly into the crankcase. The location of the inlet to this passage is such that it would be difficult to pour oil into it from a conventional cylindrical container were it not for the provision of a filler tube 9 that extends upwardly from the boss 8 and alongside the crankcase and cylinder, to have its upper end conveniently accessible next to the upper portion of the cylinder.

In order not to have the filler tube project too far out from the engine body, the filler tube has a substantial curvature along its length, as at 10, so that its upper portion is upright while its lower portion is coaxial with the bored passage in the boss 8. Suitable brackets or struts 12, which can be spot welded or otherwise secured to the filler tube at spaced locations along its length, can be secured to fixed structure on the engine body to brace and support the filler tube.

To permit the level of oil in the engine crankcase to be checked from time to time, a dip stick 14 normally extends down through the filler tube, with its lower end portion projecting into the crankcase to a level somewhat below that of the minimum oil quantity for safe engine operation. The dip stick itself comprises a length of flat bowingly flexible rod or wire which is normally straight but which, by flexing, can accommodate itself to the curvature of the filler tube. Near the top of the dip stick there is secured to it a cap or plug 16 that seats snugly in or over the upper end portion of the filler tube, to seal the filler tube and establish the normal position of the dip stick lengthwise relative to the tube. Where the closure 16 comprises a plug, as shown, the upper end portion of the dip stick rod, which projects above the plug, can be formed into a looped handle, as at 17, by which the dip stick can be withdrawn from the tube to enable the oil level to be checked and to permit oil to be poured into the tube, and the upper end of the tube can be formed to a somewhat enlarged mouth, as at 18, to facilitate filling and to receive the plug with a snug fit.

When the dip stick is withdrawn from the tube, oil clings to so much of its lower end portion as was immersed in oil in the crankcase, and serves as a readily visible indication of the crankcase oil level. To facilitate an accurate appraisal of oil quantity, suitable indicia 19 signifying the normal oil level limits can be engraved or stamped on the bottom portion of the dip stick.

Of course the purpose of the dip stick is defeated to the extent that oil is wiped off of it as it is being withdrawn from the filler tube, and to prevent such undesired wiping of the dip stick by its engagement with the bottom end of the filler tube and with the inner surface of the filler tube along the curved portion thereof, at the zone designated by 20, the present invention contemplates the provision of means on the dip stick defining protuberances that project beyond its opposite flat faces, just above the portion of the dip stick that is immersed in the oil. By means of these protuberances the surfaces of the dip stick that are beneath them are held well spaced from the tube wall all during withdrawal of the dip stick from the filler tube.

As here shown, the protuberance means comprises a small disc 22 which extends transversely to the flat surfaces of the dip stick through a closely fitting lengthwise extending slot 24 therein, and which is anchored to the dip stick by abutments 25 on the disc that securely engage the opposite flat faces of the dip stick. The disc is so located along the length of the dip stick that with the latter in its normal position, the disc is received in the lowermost portion of the filler tube, as indicated in solid lines in FIG. 2. The diameter of the disc is substantially equal to the inside diameter of the portion of the filler tube just mentioned; and the disc of course projects equal distances to opposite sides of the dip stick.

The abutments 25 on the disc are formed by stamping portions of the disc that are adjacent to the dip stick to offset them out of the plane of the remainder of the disc. As shown, the abutments are shaped like the corbels or teeth of a grater, with their edges engaging the flat surfaces of the dip stick.

In assembly, the disc is first inserted into the slot 24 in the dip stick, which confines the disc against motion relative to the dip stick both lengthwise and edgewise thereof, and then the abutments 25 are stamped in the disc to anchor it against displacement in directions normal to the faces of the dip stick.

Figure 2:
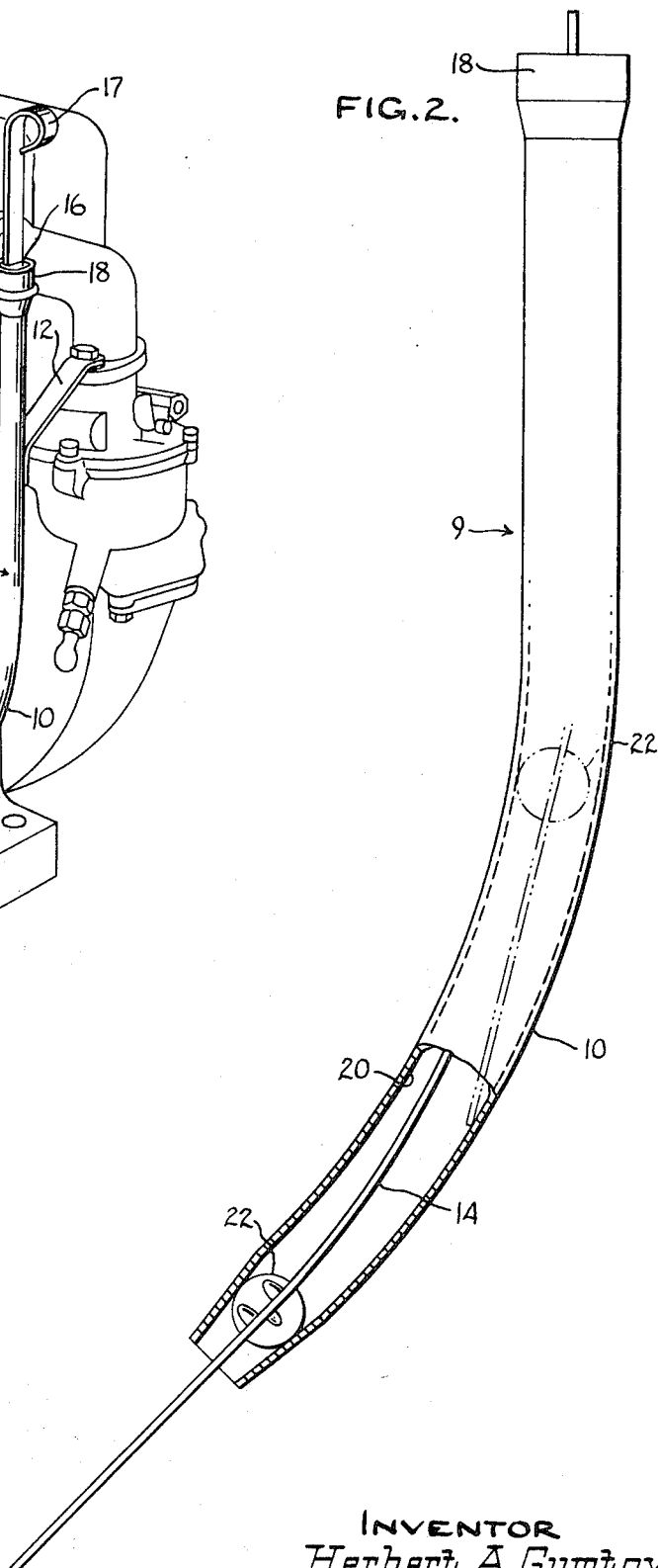
FIG. 2 is an enlarged view in side elevation of the curved oil filler tube of the engine shown in FIG. 1, with a portion of the tube broken away to show the novel feature of the dip stick of this invention.

As the dip stick is drawn up through the curved filler tube, as illustrated in dotted lines in FIG. 2, the bottom end of the dip stick and the edge of the disc engage the tube wall to provide two points of support which hold the flat surfaces of the lower indicating portion of the dip stick spaced from the tube wall all during withdrawal.

From the foregoing description taken with the accompanying drawings it will be apparent that this invention provides an improved dip stick that is normally situated in a curved filler tube and is flexingly bowed as it is withdrawn from the tube to accommodate the curvature thereof, which dip stick has very simple and inexpensive means thereon that prevent its lower indicating portion from coming into wiping engagement with the tube as the dip stick is withdrawn therefrom.

Those skilled in the art will appreciate that the invention can be embodied in forms other than as herein disclosed for purposes of illustration.

The invention is defined by the following claims:

1. In combination with a bowingly flexible dip stick having flat sides and a generally upright but curved filler tube which has a diameter substantially greater than the width of the dip stick and in which the dip stick is normally held with its lower end portion projecting a predetermined distance into a reservoir that is below the bottom of the tube, bowing flexibility of the dip stick accommodating the curvature of the tube as the dip stick is lengthwise inserted thereinto and withdrawn therefrom:

a disc extending through and fitting snuggly in a slot in the dip stick, at a distance above the lower end thereof such as to be within the lower portion of the tube when the dip stick is normally in place therein, the slot in the dip stick having its lengthwise dimension parallel to the longitudinal axis of the dip stick, said disc 1. having its surfaces substantially perpendicular to the flat sides of the dip stick and 2. having abutments thereon that engage opposite faces of the dip stick to anchor the disc to the dip stick with the disc projecting substantially equal distances beyond the dip stick faces to engage the tube and prevent the faces of the dip stick from being wipingly engaged by the tube as the dip stick is withdrawn therefrom.

2. The combination of claim 1, further characterized by:

said abutments comprising offset portions of the disc stamped out of the plane of the remainder thereof.

* * * * *